(No Model.)
C. J. PHILLIPS.
EXPANSIBLE BOLT FASTENING DEVICE.
No. 494,745. Patented Apr. 4, 1893.
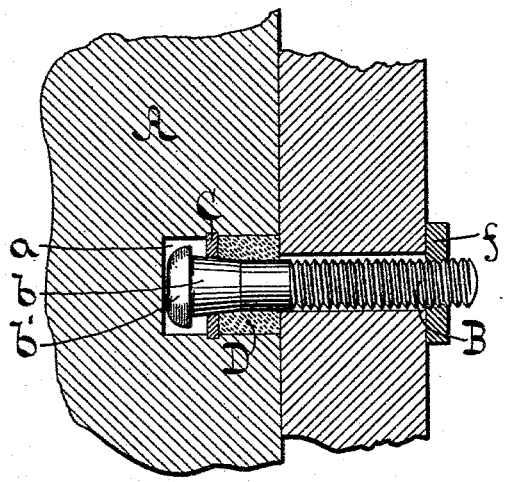
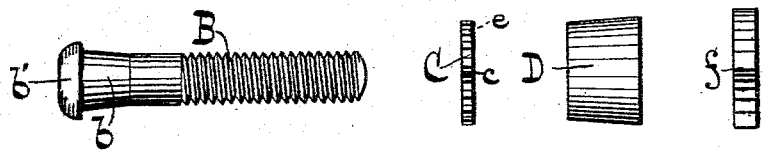
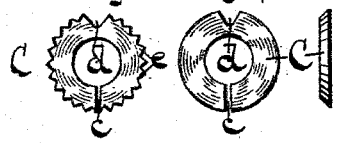
WITNESSES:
INVENTOR
Cornelius J. Phillips
BY
ATTORNEY

UNITED STATES PATENT OFFICE.

CORNELIUS J. PHILLIPS, OF NEW YORK, N. Y.

EXPANSIBLE BOLT-FASTENING DEVICE.

SPECIFICATION forming part of Letters Patent No. 494,745, dated April 4, 1893.

Application filed June 30, 1892. Serial No. 438,552. (No model.)

*To all whom it may concern:*

Be it known that I, CORNELIUS J. PHILLIPS, a citizen of the United States, and a resident of New York, in the county and State of New York, have invented certain new and useful Improvements in Expansible Bolt-Fastening Devices, of which the following is a specification.

My invention has reference to an improvement in expansion fastenings for securing bolts or screws to stone or metal work; and especially to such as are used in setting up by marble workers, plumbers, iron workers, &c.

It has for its object to simplify and to reduce the number of the parts constituting the fastening devices; to reduce the cost and to facilitate the application of the bolt or screw.

To this end my invention consists essentially in forming the bolt with a smooth taper portion at one end, and combining with the same an expansible collar adapted to be forced upon the taper portion of the bolt, and thereby expanded to bite into the work to which the bolt or screw is to be attached, all of which is more fully pointed out in the following specification and claims and illustrated in the accompanying drawings, in which:

Figure 1 represents a sectional view of my improved expansion fastening fitted within a bolt hole, or socket. Fig. 2 represents in detail the several parts. Fig. 3 is a face view of the expansible collar. Fig. 4 is a face view and Fig. 5 an end view of a modified form of the same.

Similar letters indicate corresponding parts throughout the several views.

In the drawings the letter A designates the slab of marble, or other material, into which a cylindrical hole or socket $a$ has been drilled in the usual manner, to receive the bolt B. Said bolt is provided with a threaded shank, as usual, and at its inner end it is provided with a short taper portion $b$, preferably terminating in a head $b'$.

C is the expansible collar which is bored out, or formed with a central hole large enough to permit the collar to pass freely over the bolt and onto the smaller diameter of the taper portion $b$. The collar is made in one piece, preferably of steel, and is split radially at $c$. Opposite the split is formed a notch $d$ to permit the collar to be readily expanded.

In Figs. 4 and 5, I have shown the periphery of the collar smooth and chamfered; but for rendering the device more efficient I prefer to provide the collar with a toothed or serrated edge $e$, which will bite more readily into the material of the slab. In securing the bolt to the slab, it is, together with the expansible collar, placed into the hole or socket $a$, which has been drilled of just sufficient diameter to freely admit the collar. A hollow wedge or plug D of lead, or other suitable material, is then placed into the hole and pounded in, thereby driving the collar upon the taper portion $b$ of the bolt, which causes the former to expand and bite into the slab. The wedge or plug D it will be noticed, serves subsequently to steady the bolt. $f$ is the usual nut for securing the slab in position to the part to which it is applied.

It is evident that two or more of the collars could be applied to the bolt, in which case of course they would be so placed that the slits in the collars would come on opposite sides of the bolt.

What I claim as new, and desire to secure by Letters Patent, is—

1. In an expansible fastening, the combination of a smooth taper part, and a split expansion collar constructed to fit upon the taper part and provided with a narrow edge adapted to bite into the material when said collar is expanded, substantially as and for the purpose set forth.

2. In an expansible fastening, the combination of a bolt provided with a smooth taper portion near one end, a split collar constructed to pass over the shank of the bolt and provided with a serrated edge adapted to bite into the material when said collar is forced upon the taper portion of the bolt, and a wedge or plug, D, encompassing the bolt substantially as described.

In testimony that I claim the foregoing as my invention I have signed my name, in presence of two witnesses, this 29th day of June, 1892.

CORNELIUS J. PHILLIPS.

Witnesses:
A. FABER DU FAUR, Jr.,
KLAS H. TERNSTEDT.